(12) United States Patent
Shida et al.

(10) Patent No.: US 6,215,976 B1
(45) Date of Patent: Apr. 10, 2001

(54) AUTOMATIC DOCUMENT CONVEYANCE APPARATUS

(75) Inventors: Toshio Shida; Tsuyoshi Mizubata; Satoru Endo; Masanobu Kawano, all of Hachigi; Kazuaki Itou, Saitama-ken; Osamu Kato, Higashimurayama, all of (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 09/394,781

(22) Filed: Sep. 13, 1999

(30) Foreign Application Priority Data

Sep. 16, 1998 (JP) .................................................. 10-261568

(51) Int. Cl.⁷ .......................... G03G 15/00; B65H 29/00
(52) U.S. Cl. ...................... 399/367; 271/3.19; 271/186; 358/474; 399/370
(58) Field of Search ................................... 399/367, 370, 399/372, 373; 358/474, 496, 498; 271/186, 291, 3.19

(56) References Cited

U.S. PATENT DOCUMENTS

| | | | |
|---|---|---|---|
| 5,669,056 | * | 9/1997 | Rubscha ............................... 399/367 |
| 5,887,865 | * | 3/1999 | Ishimaru ......................... 271/186 X |
| 5,926,681 | * | 7/1999 | Ishimaru ............................... 399/367 |
| 5,991,592 | * | 11/1999 | Kobayashi et al. .............. 358/496 X |
| 6,047,959 | * | 4/2000 | Baba et al. ....................... 271/291 X |
| 6,081,688 | * | 6/2000 | Okada et al. .................... 271/186 X |

FOREIGN PATENT DOCUMENTS 7-175279   7/1995   (JP) .

* cited by examiner

Primary Examiner—Susan S. Y. Lee
(74) Attorney, Agent, or Firm—Frishauf, Holtz, Goodman, Langer & Chick, P.C.

(57) ABSTRACT

An automatic document conveyance apparatus includes: a document feeding section on which a plurality of documents can be placed, for feeding documents one by one therefrom; a zigzag reversal path through which the document fed from the document feeding section is reversed with respect to front and back sides of each of the documents; a reading position forming device for forming an image reading position of the document fed zigzag from and conveyed to the zigzag reversal path; and a document ejection tray on which the document passed through the reading position forming device and ejected through an ejection path is placed. The document fed from the document feeding section is conveyed to the zigzag reversal path at which the document is reversed, the document is fed zigzag to the reading position at which one side of the document is read, the document is conveyed again to the zigzag reversal path at which the document is reversed again, the document is fed zigzag again from the zigzag reversal path to the reading position at which the other side of the document is read, and then the document is ejected from the reading position to the document ejection tray.

4 Claims, 14 Drawing Sheets

AUTOMATIC DOCUMENT CONVEYANCE APPARATUS

BACKGROUND OF THE INVENTION

The present invention relates to an automatic document conveyance apparatus used for conveying a document to a reading position for reading the document, and particularly to an automatic document conveyance apparatus by which the document can be conveyed such that obverse and reverse sides of the document are reversed, in order to read images on the obverse and reverse sides of the document. The automatic document conveyance apparatus according to the present invention is used for a copier, a facsimile device, and the like.

Preferred characteristics for the above-described automatic document conveyance apparatus are a small size, efficient reversing and conveying capabilities, and so on. As an automatic document conveyance apparatus to satisfy such requirements, for example, there is an apparatus disclosed in Japanese Tokkaihei No. 7-175279.

The automatic document conveyance apparatus disclosed in Japanese Tokkaihei No. 7-175279 has a reversal conveyance path to reverse both sides of the document, and after the document is conveyed such that its first side is read, the document is conveyed to the reversal conveyance path, and is reversed on the reversal conveyance path, and conveyed again to the reading position. The document whose second side has been read, is further reversed to align the page order at the delivery.

As described above, in the automatic document conveyance apparatus disclosed in the above patent publication, it is required that the document passes through the conveyance path 3 times in total in order to achieve reading of both sides thereof. Accordingly, in the conventional automatic document conveyance apparatus disclosed in the above patent publication, efficiency of the reading operation at the time of reading the both sides is not good, and high speed reading can not be performed, which is a problem.

SUMMARY OF THE INVENTION

Accordingly, in order to enable two-side reading, an object of the present invention is to solve the above-described problem of the conventional technology in the automatic document conveyance apparatus having the reversal conveyance function.

The above-described object of the present invention is attained by an automatic document conveyance apparatus which has: a sheet feeding source on which a large number of documents can be placed and which can feed the document one by one sheet; a reversal path through which the obverse and reverse sides of the document fed from the sheet feeding source is reversed; a reading position forming means for forming the reading position of the document which is fed from the reversal path and conveyed; and a delivery sheet tray on which documents, which pass through the reading position forming means and are delivered, are stacked, wherein the document fed from the sheet feeding source is conveyed onto the reversal path, and after the obverse and reverse sides of the document are reversed, the document is fed to the reading position forming means and the one side of the document is read, and the document whose one side is read is conveyed again onto the reversal path, and after the obverse and reverse sides of the document are reversed again, the document is fed again to the reading position and the other side of the document is read, and the document whose other side is read is delivered from the reading position forming means to the delivery tray.

DETAILED DESCRIPTION OF THE PREFERRED EMBODIMENT

Embodiment 1

(1) The structure of the automatic document conveyance apparatus.

Figure 1:
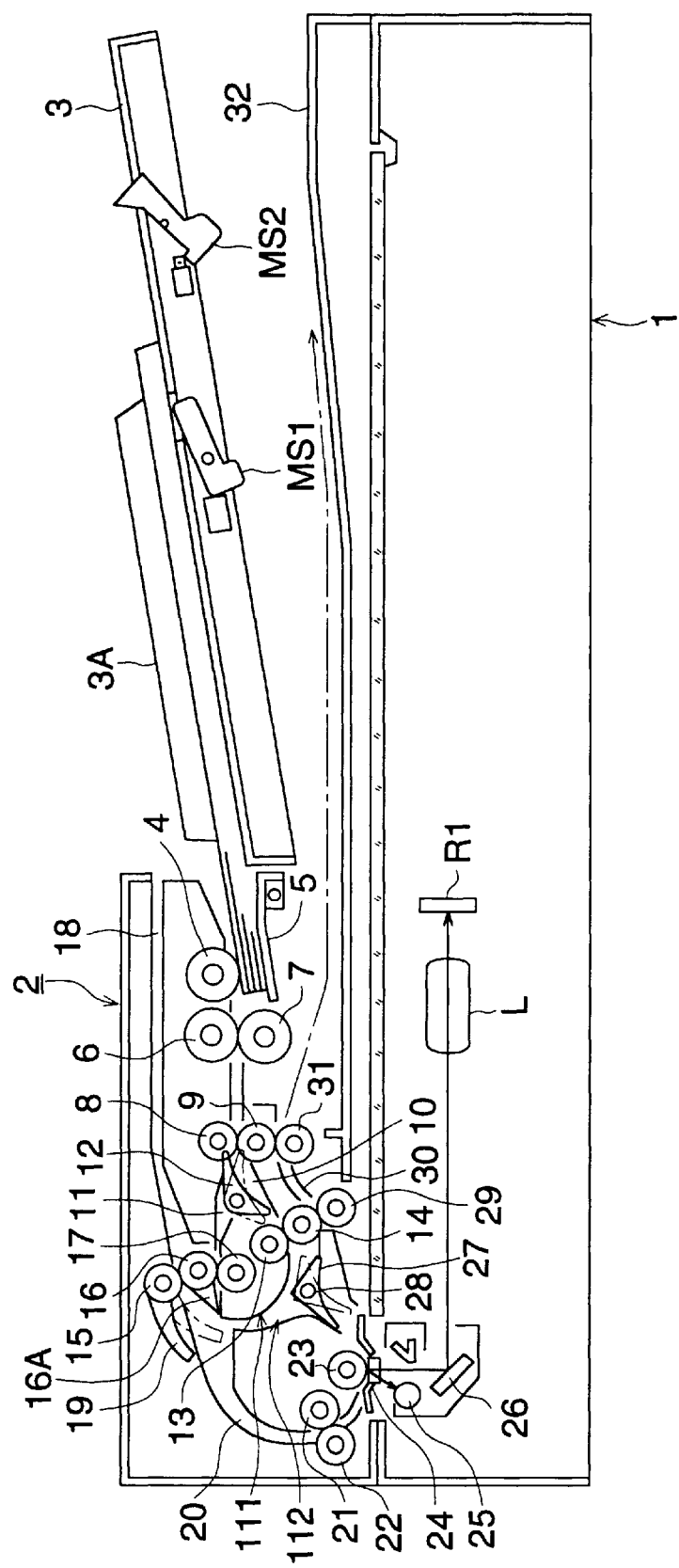
FIG. 1 is a schematic sectional view of an automatic document conveyance apparatus according to Embodiment 1 of the present invention.

FIG. 1 is a sectional view showing the structure in which an automatic document conveyance apparatus of Embodiment 1 is mounted in the frame of an image forming apparatus or the like.

As shown in the drawing, an automatic document conveyance apparatus 2 is provided in a frame 1 of the image forming apparatus. In a portion of the automatic document conveyance apparatus 2, a sheet feeding tray 3 on which document sheets P are placed and fed is provided on a little slanting condition toward the sheet feeding direction.

On the sheet feeding tray 3, a side plate 3A to regulate the side end of the document sheet P and sensors MS1 and MS2 to detect the length of the document sheet P (the length in the document conveyance direction) are provided. Only one side plate 3A is shown in the drawing, however, the side plates 3A are provided on both sides of the sheet feeding tray 3, and can move in the width direction of the document, and by this movement position, the width of the document sheet P is detected.

Further, a pick-up roller 4 to feed the documents on the sheet feeding tray 3 from the uppermost document sheet P, is provided. A pressure plate 5 to press the document sheet P to the pick-up roller 4 is provided, and this system is structured such that the leading edge of the document sheet P surely contacts with the pick-up roller 4.

Next, a separation roller 6 and a retard roller 7 are oppositely provided so that the document sheet P fed by the pick-up roller 4 can be surely conveyed one by one sheet.

A pair of register rollers 8 and 9 are provided so that one document sheet P conveyed by the separation roller 6 is stopped a time to have sheet feeding timing, and a switching guide member 12 to switch the document path to either one of a guiding path 10 for the time of two-sided document reading-out or a guiding path 11 for the time of one side document reading-out, which are respectively formed on the downstream side of the register rollers 8 and 9, is provided. A pair of conveyance rollers 13 and 14 to convey the document sheet P to the first reversal guiding path 111 formed on the downstream side of the guiding path 10 are provided, and reversal rollers 15 and 16, which are rollers rotatable in the forward and backward direction, and which receive the document sheet P reversed on the first reversal guiding path 111, convey it to the reversal section 18, and re-feed the document sheet P, are provided.

A switching guide member 19 which conducts reversal guiding of the document sheet p, and by which the document sheet P can be re-fed onto the second reversal guiding path 20, is provided on the shaft of the reversal roller 15. Further, the reversal roller 15 contacts with the reversal roller 16 when the document sheet P is conveyed, and these rollers are structured such that they can be separated from each other with the interval with which 2 document sheets can pass by each other. Further, a document sheet guide member 16A provided on the shaft of the reversal roller 16 is located at a position at which the guiding path 11 is always closed. Further, a conveyance roller 17 to convey the document sheet P conveyed from the guiding path 11 is provided in contact with the reversal roller 16.

A pair of reversal rollers 21 and 22 to convey the document sheet P to an image reading exposure section R (refer to FIGS. 2 through 5) are provided on the second reversal guiding path 20 formed in the reversal conveyance direction of the document sheet P reversal-fed by the reversal rollers 15 and 16, and further, this system is structured such that the document sheet P conveyed to the image reading exposure section R is conveyed while being nipped between a platen roller 23 and a sheet guide plate 24 formed of a transparent material. This system is structured such that irradiation light rays are irradiated by an irradiation lamp 25 onto the document sheet p passing the document reading position, the reflected light from the document is reflected by a mirror 26, and guided to an image reading section R1 through a lens L, and document reading is performed.

A switching guide member 28 to switch whether the document sheet P, reading of which has been completed, is guided to a guiding path 27 and a delivery sheet guiding path 30 as it is, or whether the document sheet P is guided again to a guiding path 112 to convey the document sheet P to the first reversal guiding path 111, is provided.

The document sheet P guided by the delivery sheet guiding path 30 is delivered to a delivery sheet section 32 by a pair of conveyance rollers 14 and 29, and a delivery sheet roller 31 provided opposite to the register roller 9.

The automatic document conveyance apparatus according to the present embodiment is provided with sensors S1, S2 and S3 to detect the passage of the document (refer to FIGS. 2 through 5).

The sensor S1 is provided on just upstream side of the first register rollers 8 and 9, and by detecting the leading edge of the document, the rotation of the separation roller 6 is stopped. A time period of the stop of the separation roller 6 is set such that a loop of the document is formed on the upstream side of the first register rollers 8 and 9. The sensor S1 further detects the passage of the trailing edge of the document. The length of the document is detected from the time period passed from the re-start of register rollers 8 and 9 to the detection of the passage of the trailing edge. Further, from the detection of the trailing edge of the document, as will be described later, the time to stop the reversal rollers 15 and 16 is determined.

The sensor S2 detects the leading edge and trailing edge of the document and determines the document reading start time and the reading completion time.

The sensor S3 detects the delivery of the document sheet P, and also has the jam detection function.

(2) Two-side reading

Next, operations to read images on two sides of the two-sided document sheet P by the automatic document conveyance apparatus 2 will be described.

Figure 2:
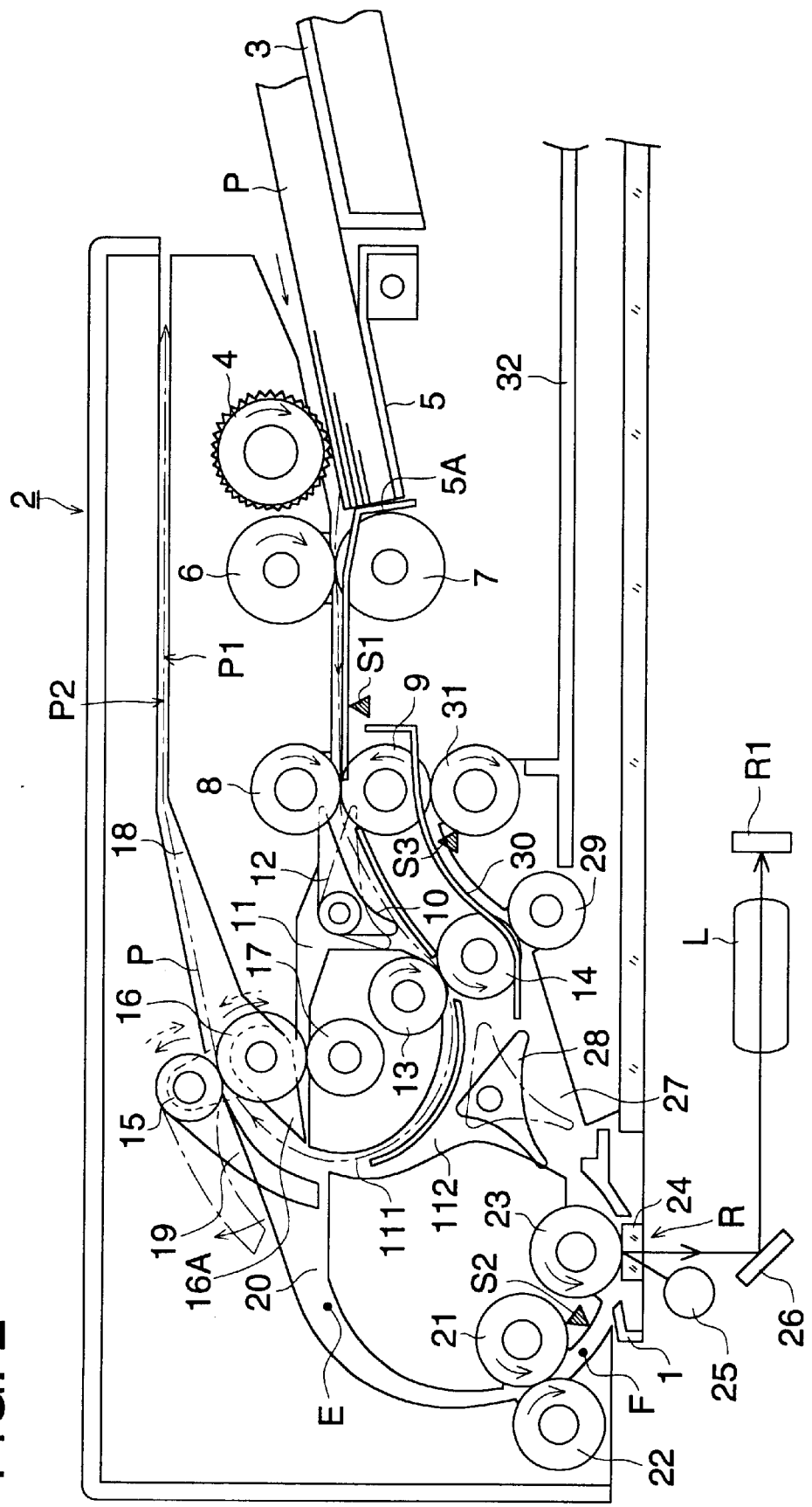
FIG. 2 is a sectional view at the time of reversal before reading-out of the automatic document conveyance apparatus shown in FIG. 1.
Figure 3:
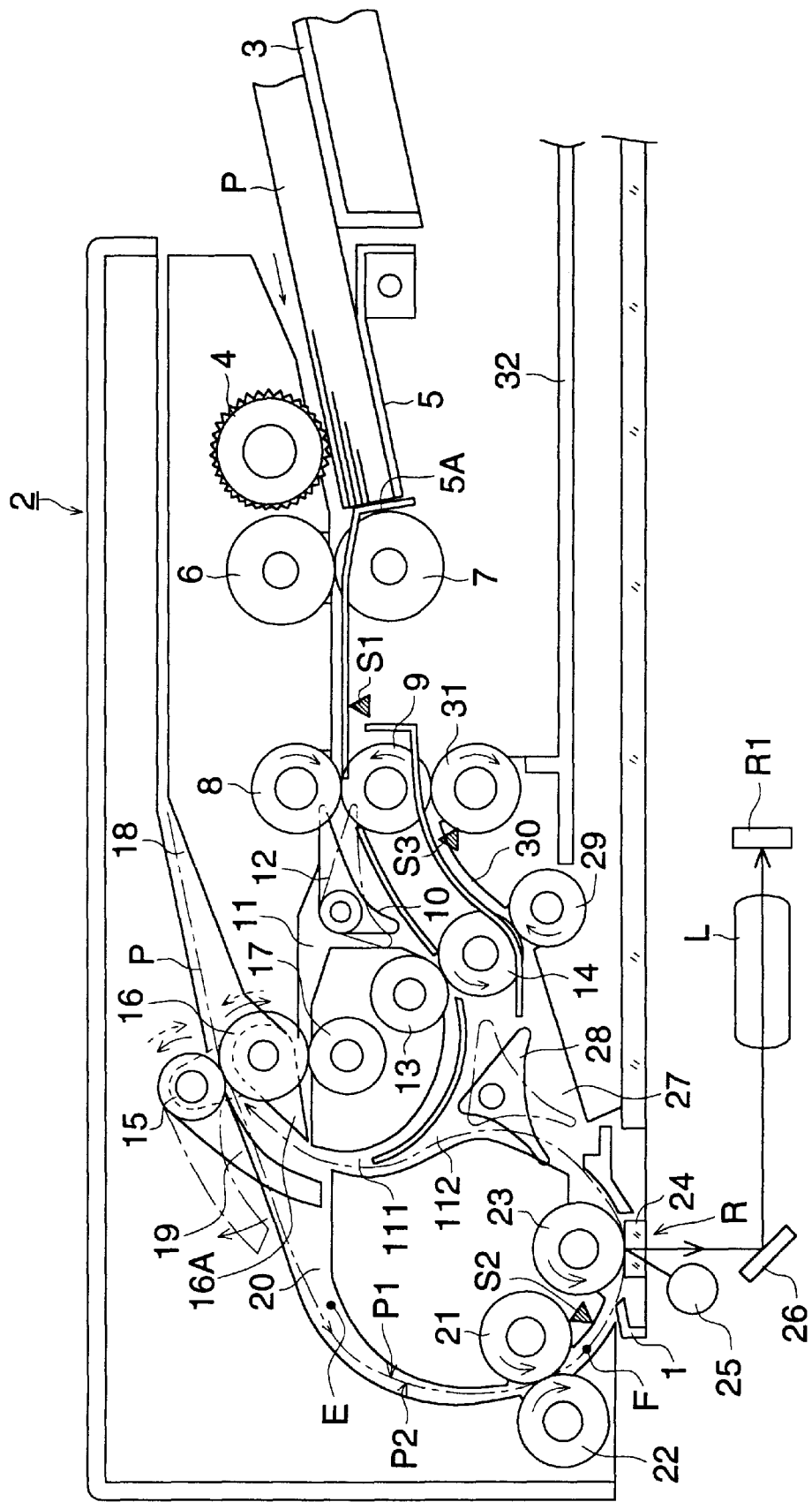
FIG. 3 is a sectional view at the time of reverse side reading of the automatic document conveyance apparatus shown in FIG. 1.
Figure 4:
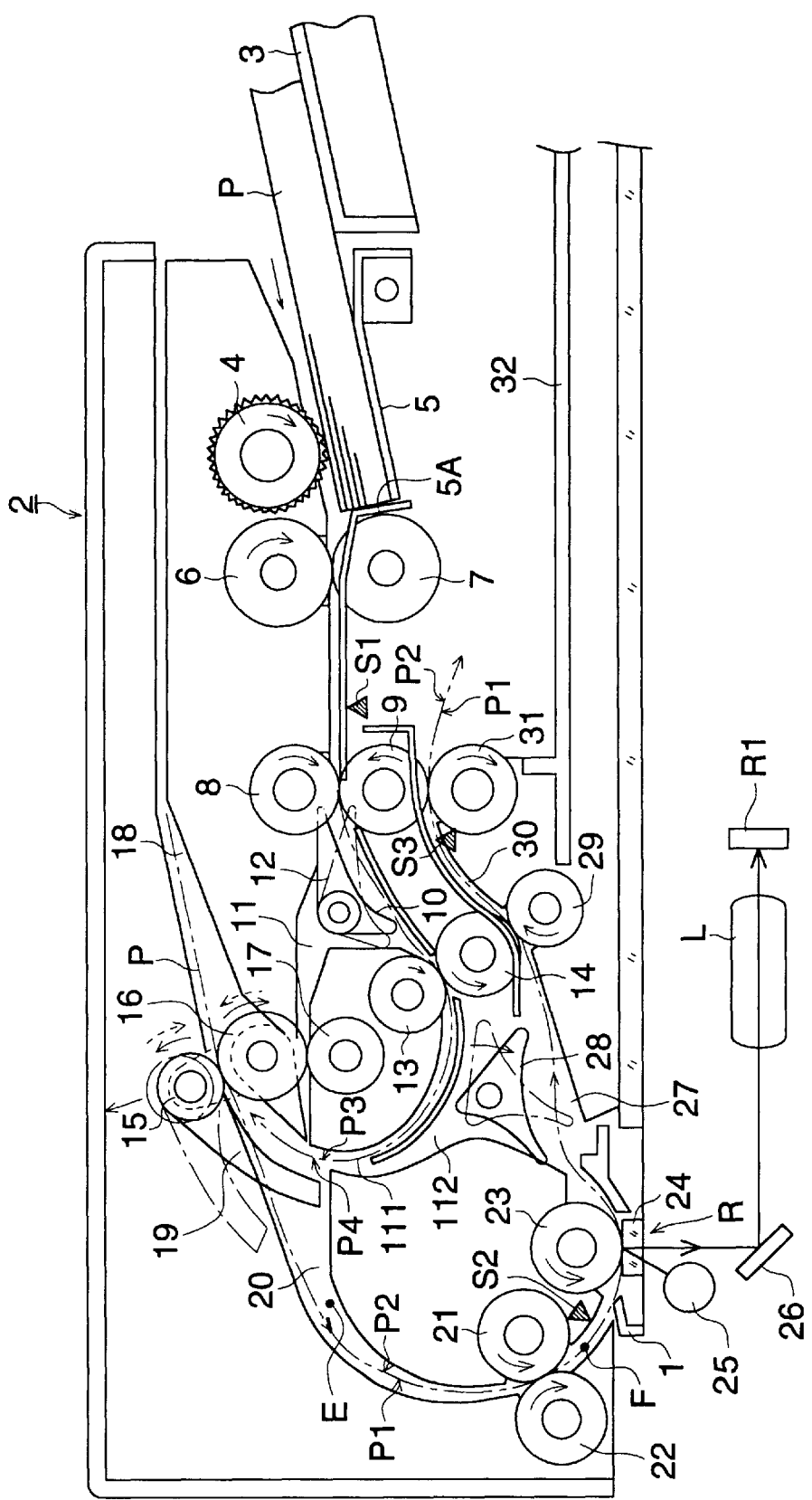
FIG. 4 is a sectional view at the time of obverse side reading of the automatic document conveyance apparatus shown in FIG. 1.

FIGS. 2–4 are sectional views of the automatic document conveyance apparatus, and show each step in two-side reading processes to read both of the obverse and reverse sides of the document sheet P.

As shown in FIG. 2, on the sheet feeding tray 3, the document sheets P are placed such that the obverse sides show the odd numbered pages and the reverse sides show the even numbered pages, that is, obverse sides of the document sheets P face upward, and the document sheets P show page 1, 2, 3, . . . , n, in regular order from above, and the sheet feeding starts by the pick-up roller 4 in this state.

The first document sheet is fed by the rotation of the pick-up roller 4 and the separation roller 6, however, a plurality of document sheets P of the second and the subsequent sheets are regulated by the retard roller 7 and the regulation member 5A, and only the first document sheet P is conveyed by the separation roller 6, and after being conveyed to the nip portion between register rollers 8 and 9, the document sheet P is stopped once, and the conveyance of the document sheet P is started by the rotation of the register rollers 8 and 9.

The loop of the leading edge portion of the document sheet P is formed at just the upstream side of the first registration rollers 8 and 9. The time period necessary for formation of the loop, that is, the time period from the time when the leading edge of the document sheet P contacts with the first register rollers 8 and 9 to the time when the separation roller 6 stops, is determined from the leading edge detection time of the sensor 1.

As shown in the drawing, the switching guide member 12 is placed at a position shown by a solid line when the conveyance starts in the case of the two-sided document reading, and guides the document sheet P to the guiding path 10 side. The document sheet P passes the guiding path 10, and is conveyed to the first reversal guiding path 111 by the conveyance rollers 13 and 14. Next, while being guided by the switching guide member 19 placed at the position shown by a solid line, the document sheet P is conveyed to a reversal section 18 by the reversal rollers 15 and 16 which are rotated in the direction shown by a solid line.

As described above, in the state that the obverse side of the first document sheet P, that is, the first page P1 faces downward, and the reverse side, that is, the second page P2 faces upward, its trailing edge is held by the reversal rollers 15 and 16, and stops once.

Timing of stop of the reversal rollers 15 and 16 is obtained from the detection signal of the document trailing edge by the sensor S1.

Next, as shown in FIG. 3, conveyance of the document sheet P located in the reversal section 18 is started from the top which is the trailing edge of the document sheet. In this case, the switching guide member 19 is switched to a position shown by a one-dotted chain line and the second reversal guiding path 20 is opened, the document sheet P is conveyed on the second reversal guiding path 20, and just after the leading edge of the document is detected by the sensor S2, conveyance rollers 21 and 22 are stopped once.

Next, the document sheet P is conveyed to the image reading exposure section R by the start of rotation of the conveyance rollers 21 and 22. At the image reading exposure section R, the second page P2 of the document sheet P is irradiated by the irradiation of the irradiation lamp 25, while the document sheet P is being conveyed by the platen roller 23, and an image on the second page P2 is successively read out through the mirror 26 and the lens L at the image reading section R1.

After a predetermined time period from the start of rotation of the conveyance rollers 21 and 22, the document reading start signal is sent to the image forming apparatus.

Next, the guiding path 112 is opened by the switching guide member 28 located at a position shown by one-dotted chain line, and the document sheet P whose second page P2 has been read, is conveyed from the guiding path 112 to the reversal section 18 through the first guiding path 111 again by reversal rollers 15 and 16. Herein, the second page P2 of the document sheet P is turned to the reverse side and the first page P1 is arranged on the obverse side, and further, the document sheet P is stopped in the state that the leading edge portion of the document sheet P is nipped between the reversal rollers 15 and 16.

As shown in FIG. 4, the conveyance of the document sheet P, which is reversed by reversal rollers 15 and 16, is started again from one end of the document sheet P from the reversal section 18. On the other hand, when sheet re-feeding of the first document sheet P from the reversal section 18 is started, sheet feeding of the second document sheet P stacked on the sheet feeding tray 3 is started by the pick-up roller 4, and the document sheet P is stopped once at the register rollers 8 and 9. The first document sheet P is conveyed on the second reversal guiding path 20, and stopped when the leading edge of the document is detected by the sensor S2.

Next, the conveyance rollers 21 and 22 are rotated and conveyance of the document sheet P is started, and when the conveyance of the conveyance rollers 21 and 22 is started, reversal rollers 15 and 16 stop their rotation, and both rollers are separated from each other. When conveyance rollers 21 and 22 start their rotation, conveyance of the document sheet P is started, and in parallel with this conveyance, register rollers 8 and 9 are rotated, and the second document sheet P is guided by the switching guide member 12, and conveyed onto the first reversal guiding path 111 by conveyance rollers 13 and 14 through the guiding path 10.

At this time, the trailing edge of the first document sheet P remains at the position of the reversal rollers 15 and 16, and because the reversal roller 15 moves in the arrowed direction, and the reversal roller 15 and the reversal roller 16 are separated from each other, the leading edge of the second document sheet P is brought into contact with the trailing edge of the first document sheet P, however, these document sheets P are smoothly conveyed to the reversal section 18.

Next, the first document sheet P conveyed by conveyance rollers 21 and 22, is conveyed to the image reading exposure section R, and in the image reading exposure section R, the first page P1 of the document sheet P is guided onto the surface of the sheet guiding plate 24 while being conveyed by the platen roller 23, and the first page P1 is irradiated by the irradiation lamp 23, and the image of the first page P1 is successively read through the mirror 26 and the lens L in the image reading section R1.

The document sheet P passed through the image reading exposure section R, is guided by the switching guide member 28 which is switched to a position shown by a solid line, and passes the guiding path 27, and is conveyed onto the delivery sheet guiding path 30 by a pair of conveyance rollers 14 and 29, and is delivered by the register roller 9 which functions as a delivery sheet roller, and the delivery sheet roller 31. The document sheet P is stacked on the delivery sheet section 32 in the state that the first page P1 faces the lower side and the second page P2 faces the upper side.

The sensor S3 detects the trailing edge of the document sheet P to be delivered and outputs a delivery sheet signal. When the delivery sheet signal is not outputted within the predetermined time corresponding to the size of the document sheet P, this situation is judged to be a jam.

Next second document sheet P is the same as described above, and is placed in the state that the third page P3 faces the lower side, and the fourth page P4 faces the upper side, and even after images of a large number of two-sided document sheets are read out, the document sheets are delivered in the state that the page order is successively aligned.

In a fixed size mode in which one kind of size of document sheets P are placed on the sheet feeding tray 3, and the document sheet p is conveyed to the reading position and read, and a mixed-size mode in which various-sized document sheets P are placed on the sheet feeding tray 3, and the document sheet p is conveyed to the reading position and read, the above-described processes of conveyance and reading of the document sheet P are performed.

However, detection of the document size in the fixed size mode is carried out by using the side plate 3A, and sensors MS1 and MS2. From the combination of the position information of the side plate 3A and on/off information of sensors MS1 and MS2, the longitudinal placement (the state that the document conveyance direction corresponds to the long side of the document) and the lateral placement (the state that the document conveyance direction corresponds to the short side of the document) are detected relating to each size of A3, A4, B4 and B5.

In the mixed-size mode, the document length is detected by the sensor S1 in the process in which the document sheet P is conveyed from register rollers 8 and 9 to the reversal section 18, and the document size is calculated from the detected length.

(3) One side reading

Figure 5:
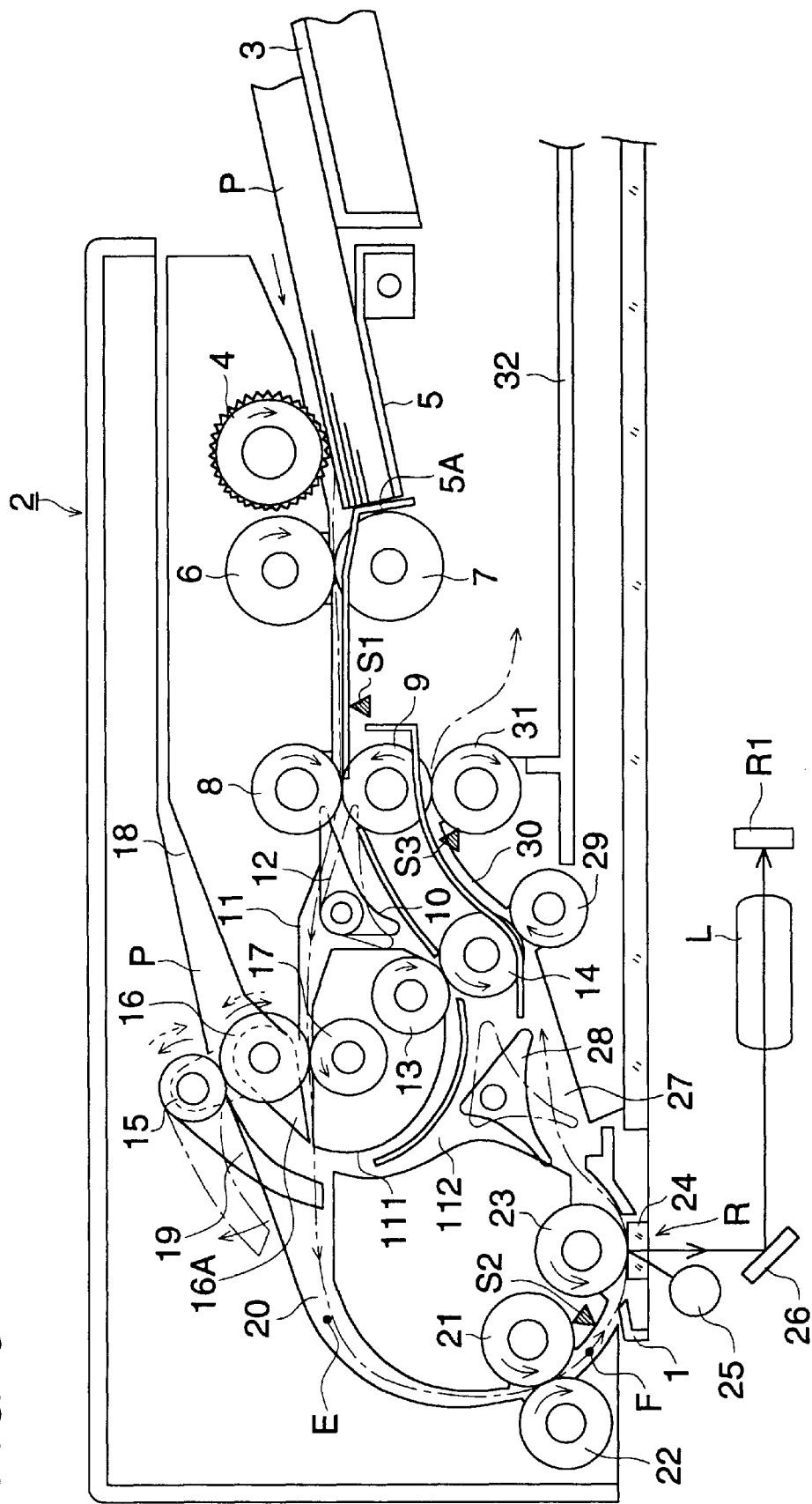
FIG. 5 is a sectional view at the time of one side reading of the automatic document conveyance apparatus shown in FIG. 1.

FIG. 5 is a sectional view of the automatic document conveyance apparatus in the reading process of the image on the one side of the document.

In the one side reading, the document sheet P is placed on the sheet feeding tray 3 with its surface facing upward. Next, the document sheet P is fed by the pick-up roller 4 and successively conveyed one by one sheet by the separation roller 6, and is guided by the switching guide member 12 which is switched to a position shown by a one-dotted chain line, and conveyed onto the guiding path 11 by register rollers 8 and 9.

Next, the document sheet P is directly conveyed onto the second reversal guiding path 20 by the conveyance roller 17 which is in contact with the reversal roller 16. In this case, the switching guide member 19 is switched to a position shown by a one-dotted chain line, and the document sheet P is guided from the second reversal guiding path 20 to conveyance rollers 21 and 22 and conveyed to the image reading exposure section R. In the image reading exposure section R, the image on one side, that is, the obverse side image is irradiated by the irradiation lamp 25, and the image is successively read through the mirror 26 and the lens L in the image reading section R1.

The document sheet P passed the image reading exposure section R passes the guiding path 27 which is opened by the switching guide member 28 which is located at the position shown by a solid line, and is conveyed onto the delivery sheet guiding path 30 by a pair of conveyance rollers 14 and 29, and is delivered onto the delivery sheet section 32 in the state that the image of the first document sheet P faces downside.

In the same manner, the second document sheet P is also conveyed from the guiding path 11 to the second reversal guiding path 20, and after the image is read in the image reading exposure section R, the image on the document sheet P faces downward and is delivered onto the delivery sheet section 32 in the state that pages are aligned.

The above-described document conveyance process is a conveyance process in the fixed size mode in which a kind of document sheets are placed on the sheet feeding tray, and the document size detection in this mode is performed on the sheet feeding tray 3 by the side plate 3A and sensors MS1 and MS2.

In the mixed-size mode in which various-sized document sheets are placed on the sheet feeding tray, and the document conveyance and reading are conducted, the document is conveyed in the process which will be described below.

The document sheet P conveyed by the start of rotation of register roller 8 and 9, is conveyed by conveyance rollers 21 and 22 through the second reversal guiding path 20, and reaches the delivery sheet roller 31 through the platen roller 23. In this conveyance process, document reading is not conducted, and document size detection by the sensor S1 is conducted. The document size is detected from the time period passed from the start of rotation of register rollers 8 and 9 to the detection of the trailing edge of the document by the sensor S1. Conveyance of the document is stopped after a predetermined time period passed from detection of the trailing edge of the document by the sensor S1. When the document is stopped, the trailing edge of the document is located at a position shown by E.

Next, conveyance rollers 21 and 22 start the rotation in the direction as shown by a dotted line, and the document sheet P is conveyed to the reversal section 18. The conveyance is stopped when the leading edge (the trailing edge in the process conveyed from conveyance rollers 21 and 22 to the reversal section 18) of the document sheet P is detected by the sensor S2. That is, the leading edge of the document is located at a position shown by F and the document conveyance is stopped.

Next, conveyance rollers 21 and 22 start the rotation in the directions shown by solid lines, and convey the document sheet P toward the delivery sheet roller 31 through the platen roller 23. In this conveyance process, reading is conducted.

Embodiment 2

Next, although it is basically the same as the above-described embodiment 1, an automatic document conveyance apparatus of the embodiment in which the conveyance path of the document sheet P is varied, will be described.

(1) Two-side reading

Figure 6:
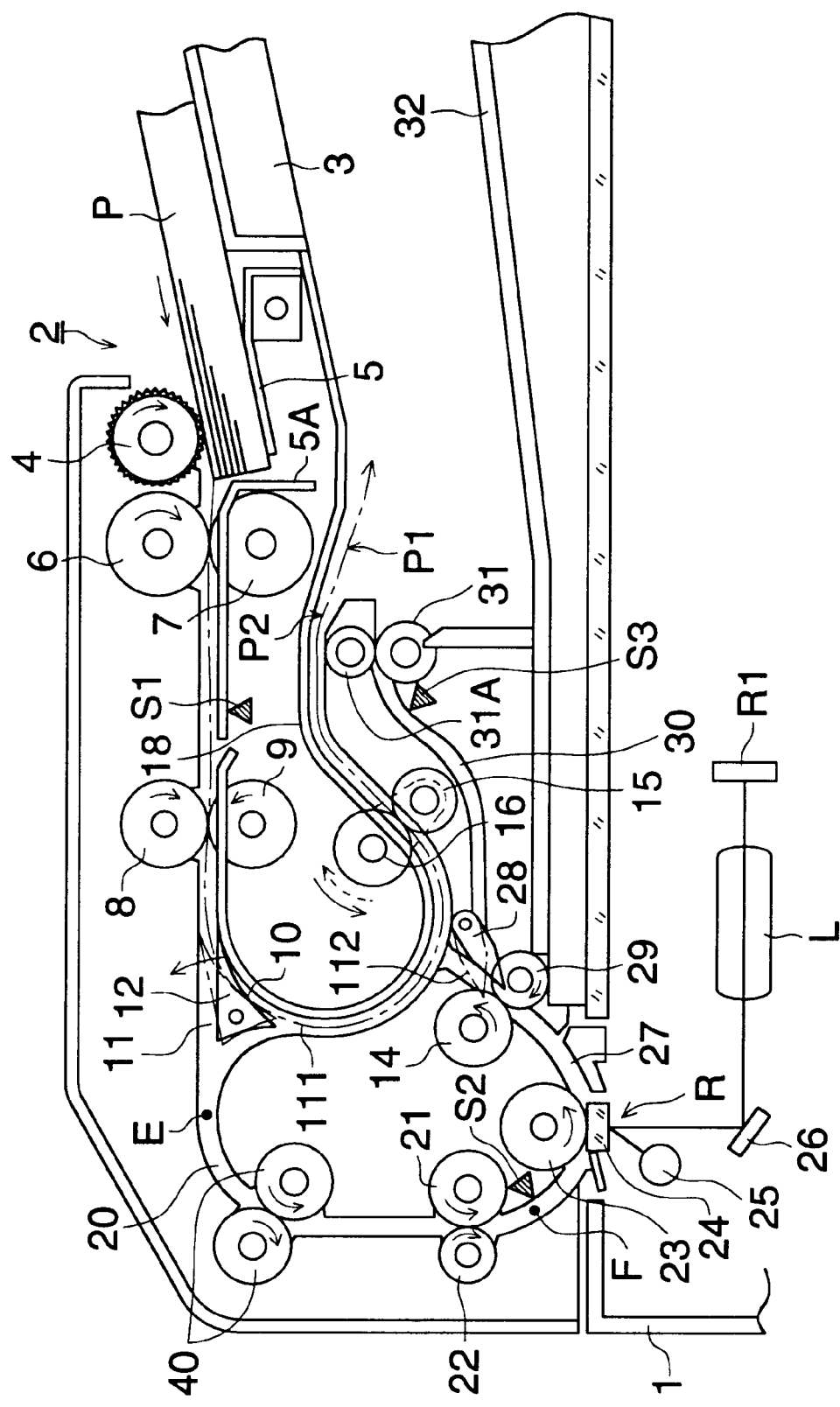
FIG. 6 is a sectional view at the time of reversal before reading-out of the automatic document conveyance apparatus according to Embodiment 2 of the present invention.
Figure 7:
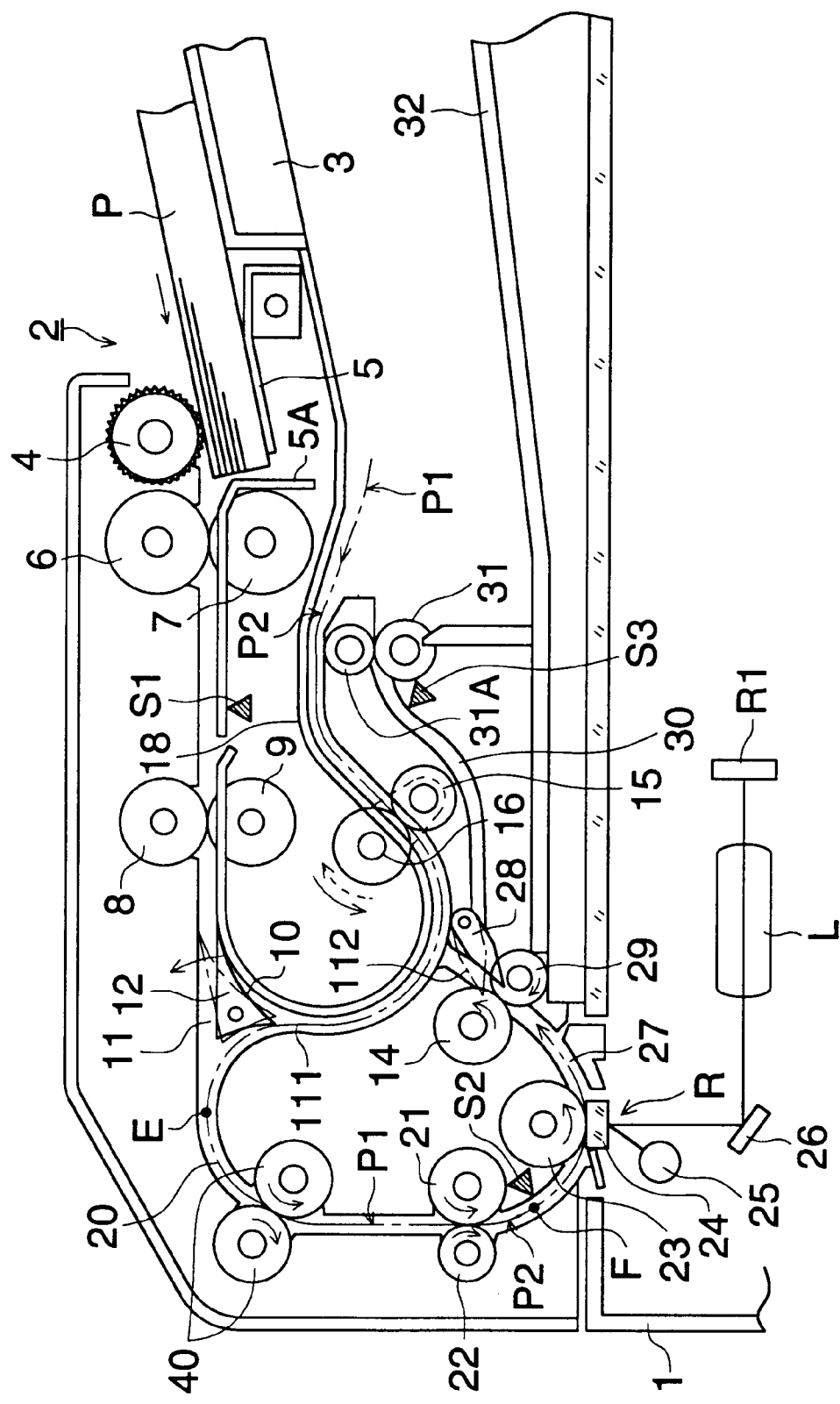
FIG. 7 is a sectional view at the time of reverse side reading of the automatic document conveyance apparatus shown in FIG. 6.
Figure 8:
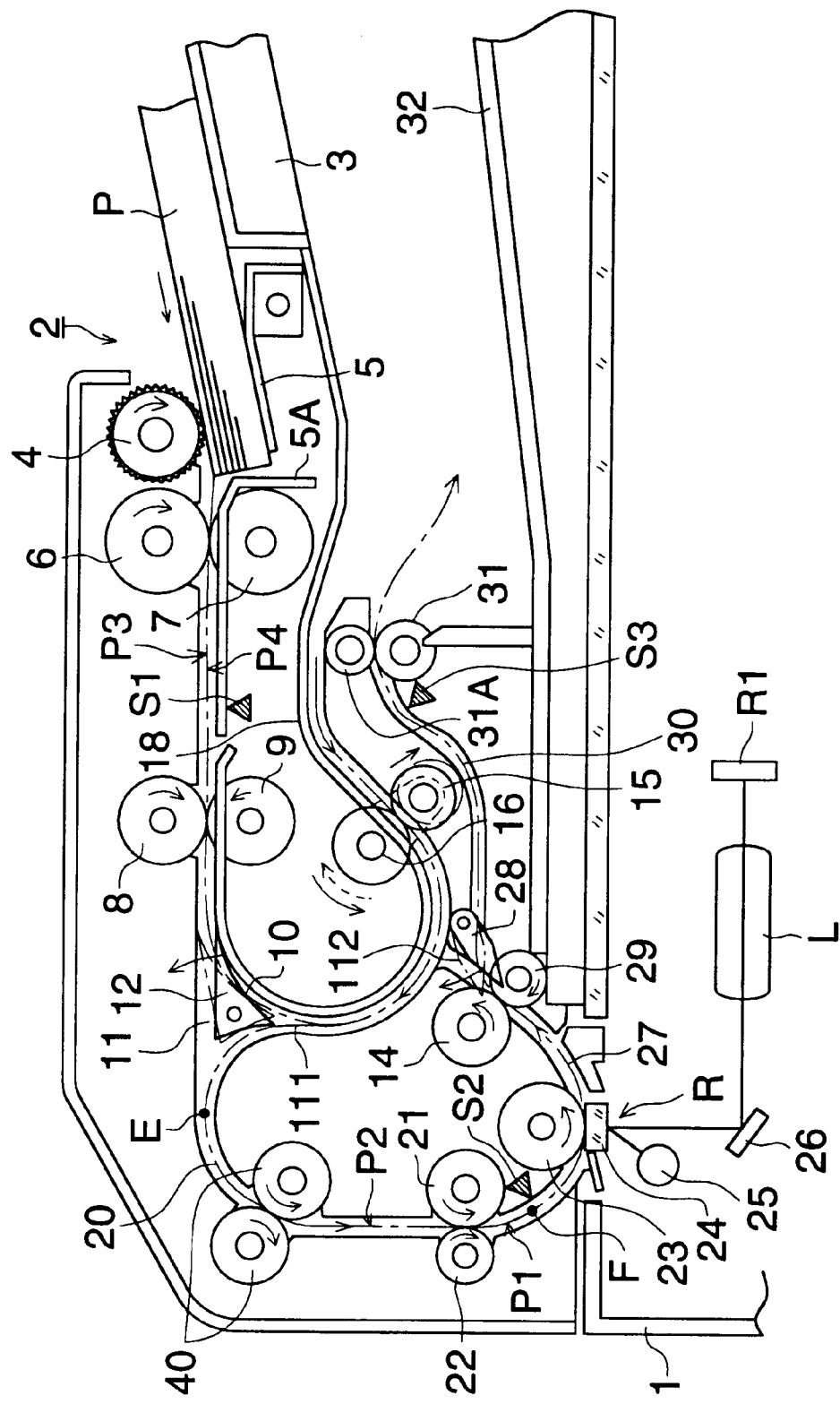
FIG. 8 is a sectional view at the time of obverse side reading of the automatic document conveyance apparatus shown in FIG. 6.

FIGS. 6 through 8 are sectional views of the automatic document conveyance apparatus in two-side reading process.

As shown in FIG. 6, in the same manner as described above, two-sided document sheets P are placed, and sheet feeding is started by the pick-up roller 4 in this state.

Next, in the same manner as described above, only the first sheet P is conveyed by the separation roller 6 to a portion between register rollers 8 and 9, after that, the document sheet P is stopped once, and conveyance of the document sheet P is started by the rotation of register rollers 8 and 9.

As shown in the drawing, the switching guide member 12 is moved in the arrowed direction and set in a position shown by a one-dotted chain line and is switched to the guiding path 10 side for the time of two-sided document reading, and the document sheet P passes through the guiding path 10 and conveyed to the first reversal guiding path 111, and conveyed to the reversal section 18 by reversal rollers 15 and 16.

In such a manner as described above, in the reversal section 18, the document sheet P is placed such that the first side P1 of the first document sheet P faces downward and the second page P2 faces upward, and reversal rollers 15 and 16 are stopped in the state that these rollers 15 and 16 nip the trailing edge of the document sheet P.

Next, as shown in FIG. 7, conveyance of the first document sheet P which is reversed by the reversal rollers 15 and 16, is started from the trailing edge of the document sheet P, from the reversal section 18. In this case, the switching guide member 12 is at the position shown by a one-dotted chain line, and the second reversal guiding path 20 is opened. The document sheet P is conveyed to the second reversal guiding path 20, and is conveyed by a pair of conveyance rollers 40 and conveyance rollers 21 and 22, and just after the leading edge of the document sheet P is detected by the sensor S2, the conveyance is stopped once.

When the rotation of conveyance rollers 21 and 22 is started, the document sheet P is conveyed to the image reading exposure section R. In the image reading exposure section R, the second side P2 of the document sheet P is guided by the surface of the sheet guiding plate 24 while the document sheet P is conveyed by the platen roller 23, and the second side P2 is irradiated by the irradiation lamp 25, and the image on the second side P2 is successively read through the mirror 26 and lens L in the image reading section R1.

Next, the document sheet P is conveyed to the reversal section 18 by reversal rollers 15 and 16 which are rotated in the direction shown by a solid line, through the first reversal guiding path 111 again, from the guiding path 112 which is opened by the switching guide member 28 which is at a position shown by a solid line. Herein, the document sheet P is placed such that the second page P2 of the document sheet P is on the lower side and the first page P1 is on the upper side, and further, the document sheet P is stopped in the state that its trailing edge is nipped between reversal rollers 15 and 16.

Next, as shown in FIG. 8, the reversal rollers 15 and 16 start the rotation in the direction shown by a dotted line, and conveyance of the document sheet P is started form its trailing edge as the top of the conveyance. In the conveyance process of the first document sheet P, the second document sheet P placed on the sheet feeding tray 3 is fed by the pick-up roller 4, and stops once at register rollers 8 and 9. The first document sheet P is reversal-conveyed on the first reversal guiding path 111 by reversal rollers 15 and 16, and conveyed on the second reversal guiding path which is opened by the switching guide member 12, by the conveyance rollers 40, and just after the leading edge of the document is detected by the sensor S2, the document sheet P is stopped once. Conveyance of the document sheet P is started when conveyance rollers 21 and 22 start the rotation, and the stopped second document sheet P is guided to the switching guide member 12 by the rotation of register rollers 8 and 9, and is conveyed from the guiding path 10 onto the first reversal guiding path 111. When conveyance rollers 21 and 22 are rotated and the conveyance is started, reversal rollers 15 and 16 are separated from each other, and holding of the document sheet P is released.

Herein, the trailing edge of the first document sheet P remains at a position of reversal rollers 15 and 16, and while the trailing edge of the first document sheet P and the leading edge of the second document sheet P are in contact with each other in the first reversal guiding path 111, these documents P are conveyed.

Further, the leading edge of the second document sheet P is conveyed to the position of reversal rollers 15 and 16, and even if the trailing edge of the first document sheet P remains between the reversal rollers 15 and 16, because the reversal roller 15 is moved in the arrowed direction in FIG. 8, and the reversal rollers 15 and 16 are separated from each other, these document sheets P are smoothly conveyed to the reversal section 18 even if the leading edge of the second document sheet P is being in contact with the trailing edge of the first document sheet P.

Next, the first document sheet P conveyed by conveyance rollers 21 and 22, is conveyed to the image reading exposure section R, and while being conveyed by the platen roller 23 in the image reading exposure section R, the document sheet P is guided onto the sheet guiding plate 24 surface, and the first page P1 of the document sheet P is irradiated by the irradiation lamp 25, and the image of the first page P1 is successively read out in the image reading section R1 through the mirror 26 and the lens L.

The document sheet P whose first page image is read out, is conveyed to the delivery sheet guiding path 30 by conveyance rollers 14 and 29, and the first page P1 of the first document sheet P is delivered with its surface facing downward onto the delivery sheet section 32 by a pair of delivery sheet rollers 31 and 31A.

In such a manner as described above, the document sheet P on both sides of which images are formed, is delivered with the first page P1 facing the lower side, and also the second document sheet P is delivered in the same manner with its third page P3 facing the lower side, and a large number of document sheets P are successively conveyed and after images on obverse and reverse sides have been read out, the document sheets P are delivered in the state that the page order is aligned.

The document conveyance and reading in the fixed size mode, and the document conveyance and reading in the mixed-size mode are the same as those in the case of Embodiment 1, and there is no difference in the conveyance process of the document sheet P between both modes.

(2) One side reading

Figure 9:
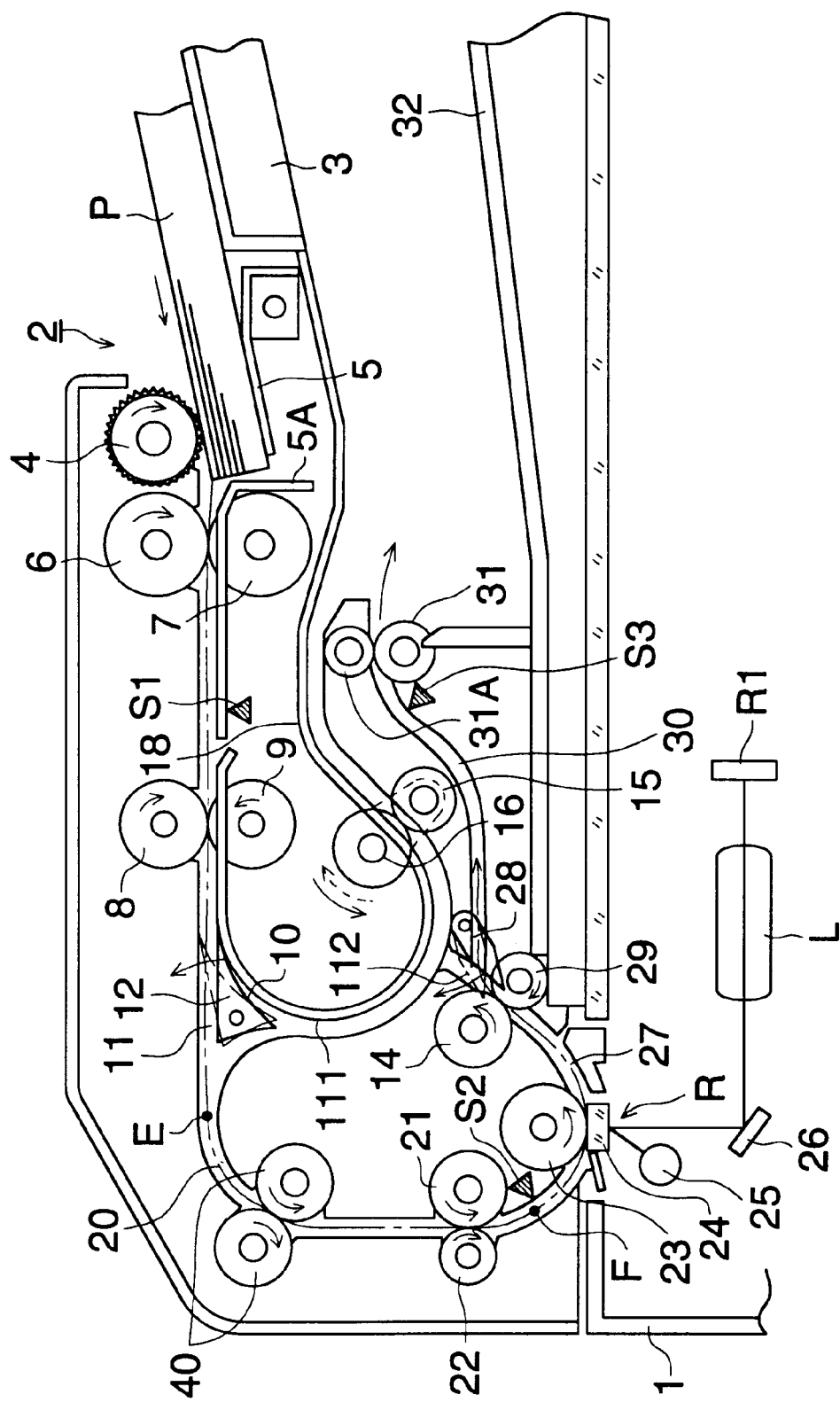
FIG. 9 is a sectional view at the time of one side reading of the automatic document conveyance apparatus shown in FIG. 6.

FIG. 9 is a sectional view of Embodiment 2 in the case of one side document reading.

Also in this case, the document sheet is placed on the sheet feeding tray 3 with the image of the document sheet P facing the upside. The document sheet P is fed from the first sheet of the document sheet P by the pick-up roller 4, and is successively conveyed one by one sheet as described above, and conveyed onto the guiding path 11 by register rollers 8 and 9 after the guiding path 11 is opened by the switching guide member 12 set at the position shown by a solid line.

Next, the document sheet P is guided from the second reversal guiding path 20 by conveyance rollers 21 and 22 and conveyed to the image reading exposure section R. In the image reading exposure section R, the surface of the document sheet P is irradiated by the irradiation lamp 25, and the image is read out in the image reading section R1 through the mirror 26 and the lens L. The document sheet P passed the reading position is conveyed to the delivery sheet guiding path 30 by a pair of conveyance rollers 14 and 29 because the delivery sheet guiding path 30 is opened by the switching guide member 28 which is set at the position shown by a one-dotted chain line, and is delivered onto the delivery sheet section 32 in the state that the image of the first document sheet P faces the lower side by delivery rollers 31 and 31A.

In the same manner, the second and subsequent document sheets P are conveyed from the guiding path 11 to the second reversal guiding path 20, and after the image is read out in the image reading exposure section R, the image on the document sheet P faces down side and delivered onto the delivery sheet section 32 in the state that images and pages are aligned.

In the one side reading in the fixed size mode, the document size is detected by the side plate 3A and microswitches MS1 and MS2 in the same manner as in Embodiment 1.

Next, the one side reading in the mixed-size mode will be described.

The document sheet P conveyed by register rollers 8 and 9, is conveyed by the conveyance roller 40, and conveyance rollers 21 and 22, guided by the switching guide member 28 located at the position shown by a dotted line, and conveyed onto the delivery sheet guiding path 30. The document size is detected by the sensor S1 in this conveyance process. That is, the document size is detected from the time period passed from the start of rotation of register rollers 8 and 9 to the detection of the trailing edge of the document by the sensor S1. In this conveyance process, reading is not carried out.

The conveyance of the document is stopped after a predetermined time period from the detection of the trailing edge by register rollers 8 and 9, and the document sheet P is stopped in the state that its trailing edge is at a position shown by E.

Next, conveyance rollers 21 and 22 are reversely rotated as shown by a dotted line, and the document sheet P is reversely conveyed. The document sheet P is guided by the switching guide member 12 located at the position shown by a dotted line to the first reversal guiding path 111, conveyed to the reversal section 18, and by the detection of the trailing edge by the sensor S2, the leading edge (the trailing edge in the process conveyed from conveyance rollers 21 and 22 to the reversal section 18) is located at a position shown by a point F and stopped.

Next, conveyance rollers 21 and 22 are reversely rotated in the direction shown by a solid line and convey the document sheet P, and the document sheet P is conveyed through the platen roller 23, and reading is carried out. The document sheet P is further conveyed through the delivery sheet guiding path 30, and delivered onto the delivery sheet section 32 by the delivery sheet roller 31.

Figure 14:
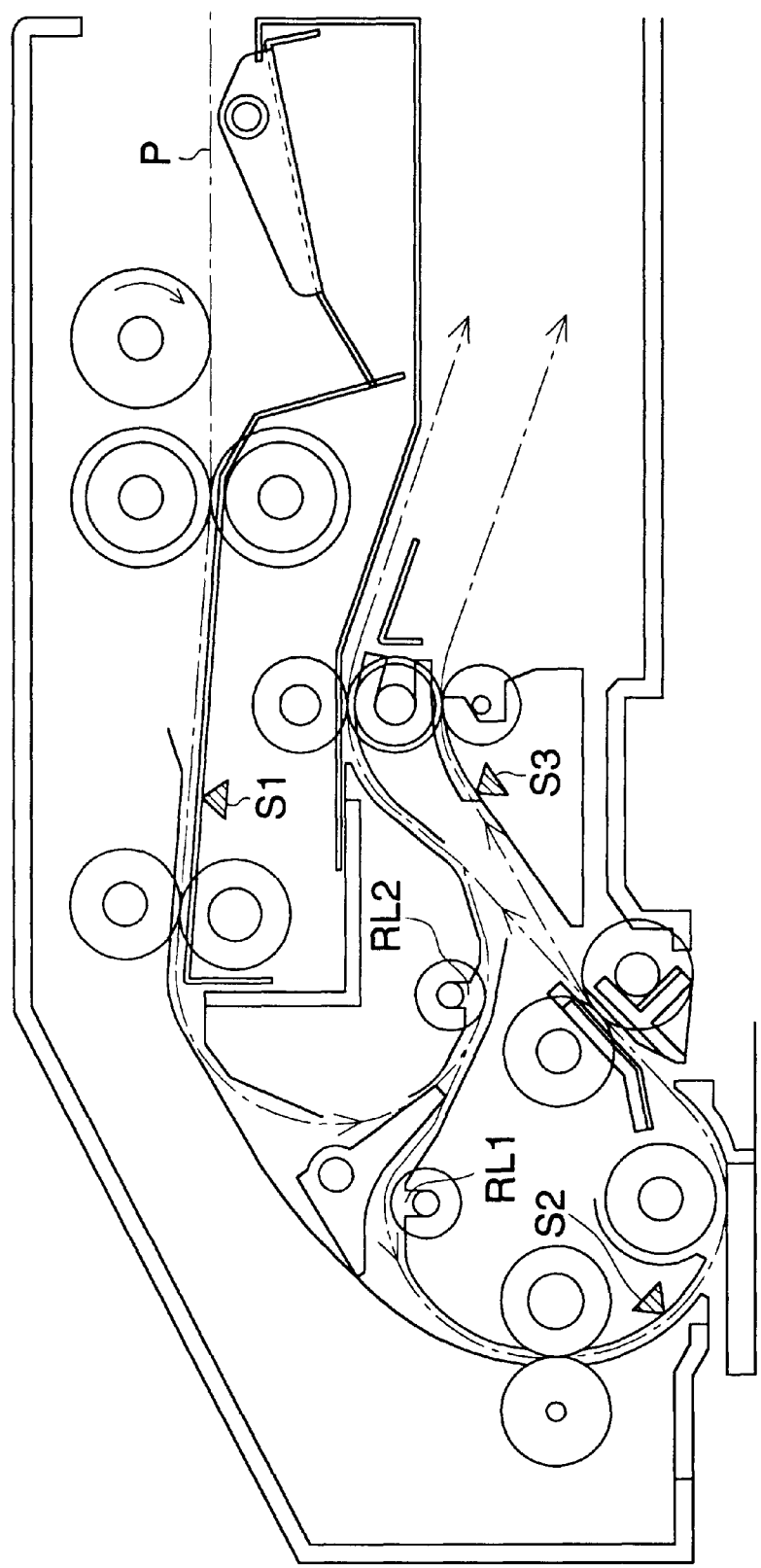
FIG. 14 is a sectional view of the automatic document conveyance apparatus of a more preferable Embodiment applied to the Embodiment 2 of the present invention.

Further, FIG. 14 is a sectional view of the automatic document conveyance apparatus showing a more preferable Embodiment applied to the Embodiment 2 of the present invention. The main difference from the Embodiment 2 is that there are disposed, for example, roll RL1, RL2 in the conveyance path of a document in which curvature of the conveyance path is relatively large and friction resistance tends to be applied to the document, thereby conveyance performance can be improved.

Embodiment 3

(1) Two-side reading

Next, the automatic document conveyance apparatus of Embodiment 3 which is basically the same as Embodiments 1 and 2 and in which the conveyance path of the document sheet P is varied, will be described.

Figure 10:
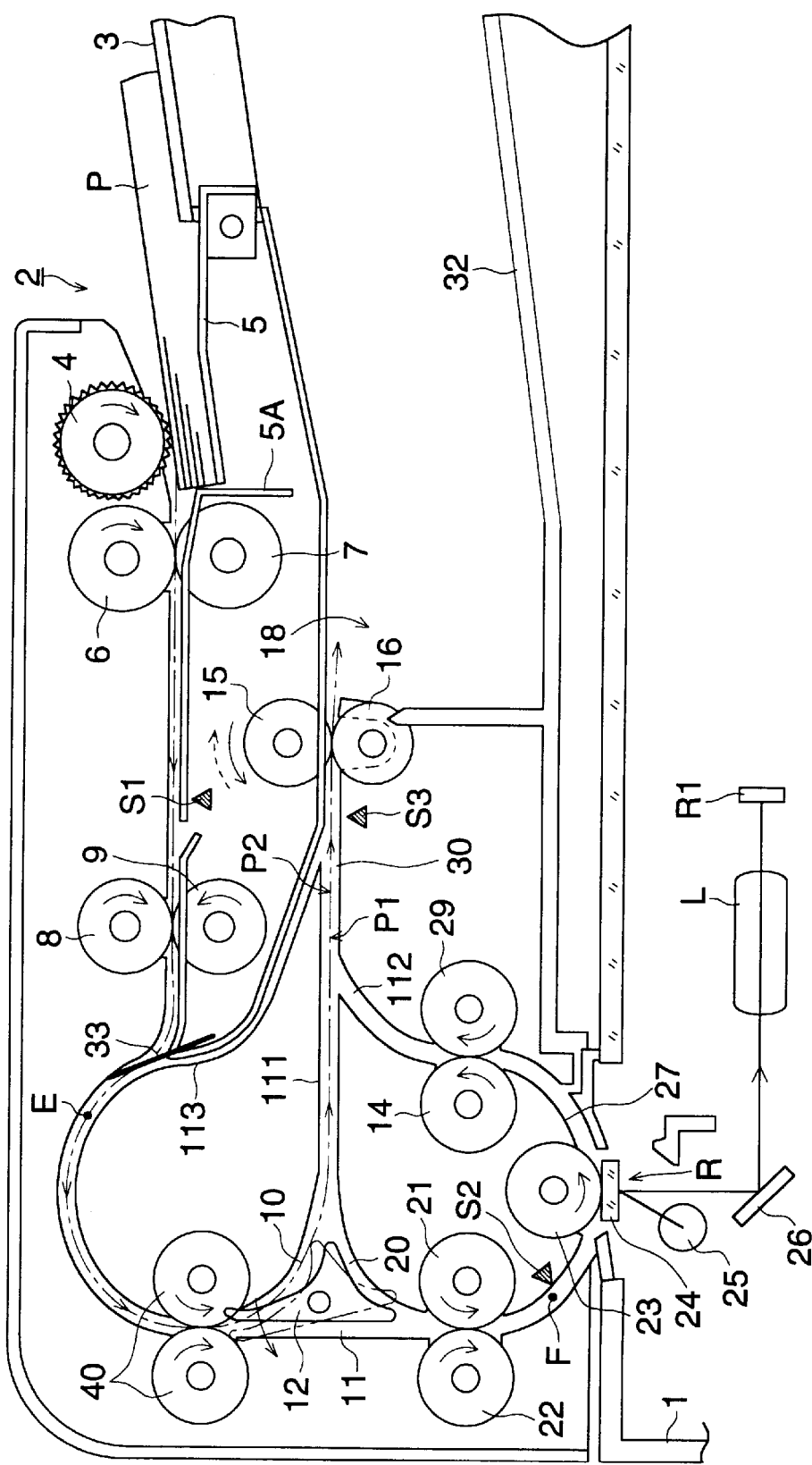
FIG. 10 is a sectional view at the time of reversal before reading-out of the automatic document conveyance apparatus according to Embodiment 3 of the present invention.

As shown in FIG. 10, two-sided document sheet P is placed in the same manner as described above, and sheet feeding is started by the pick-up roller 4 in this state.

Next, in the same manner as described above, only the first document sheet P is conveyed by the separation roller 6, and after conveyed to a portion between register rollers 8 and 9, the document sheet P is stopped once, and conveyance of document sheet P is started by rotation of register rollers 8 and 9.

As shown in FIG. 10, the switching guide member 12 is moved in the arrowed direction and set at the position shown by a one-dotted chain line, and is switched to the guiding path 10 side for the time of two-sided document reading, and the document sheet P passes through the guiding path 10, and is conveyed onto the first reversal guiding path 111 by a pair of conveyance rollers 40, and conveyed to the reversal section 18 (the upper position of the delivery sheet section 32) by reversal rollers 15 and 16.

In the manner as described above, in the reversal section 18, the document sheet P is conveyed in the state that the first page P1 of the first document sheet P faces the down side, and the second page P2 faces the upside. Next, reversal rollers 15 and 16 are stopped in the state that the trailing edge of the document sheet P is nipped between reversal rollers 15 and 16.

Figure 11:
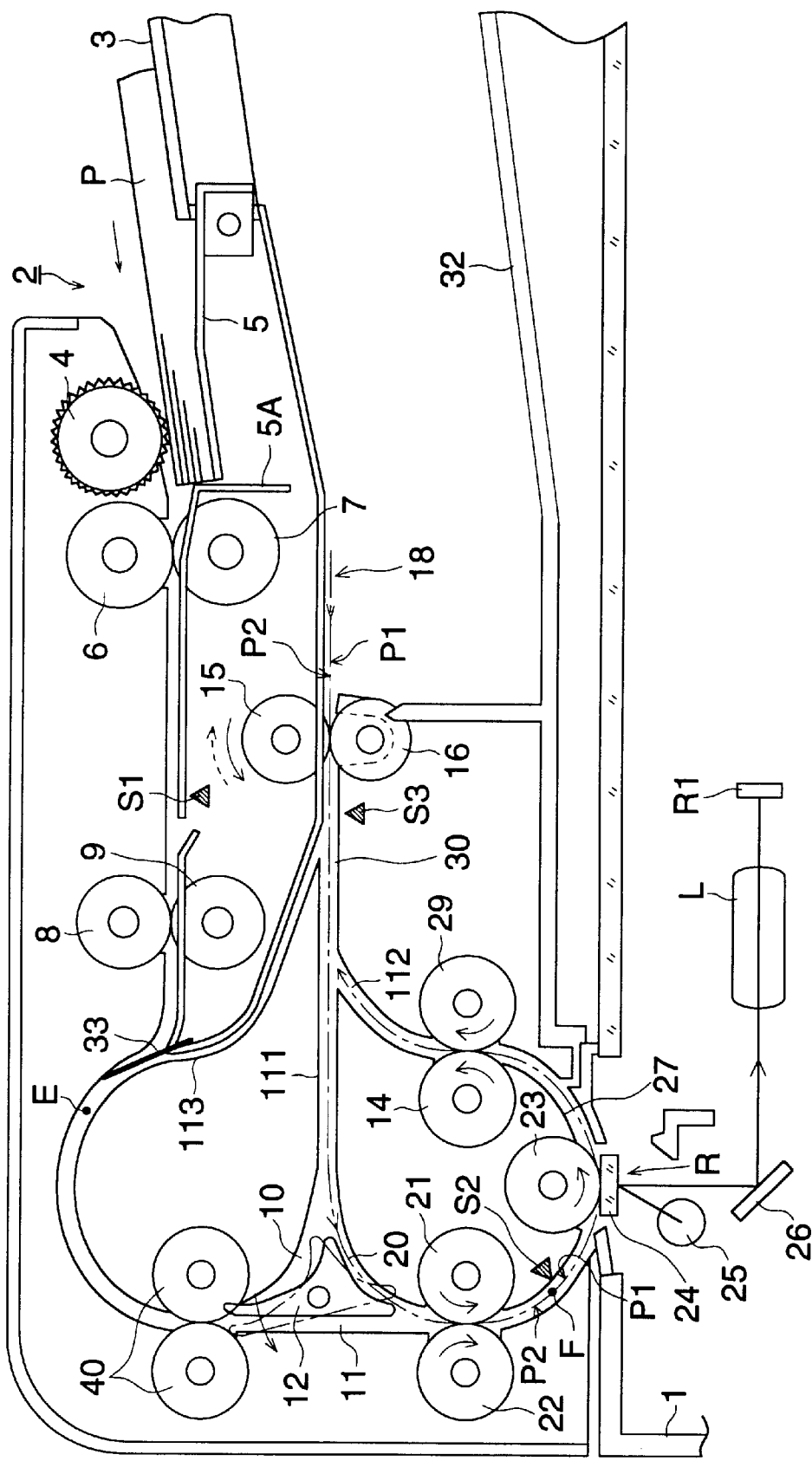
FIG. 11 is a sectional view at the time of reverse side reading of the automatic document conveyance apparatus shown in FIG. 10.

Next, as shown in FIG. 11, conveyance of the first document sheet P which is reversed by reversal rollers 15 and 16, is started from the trailing edge of the document sheet P from the reversal section 18. In this case, the switching guide member 12 is located at a position shown by a one-dotted chain line, and opens the second reversal guiding path 20, the document sheet P is conveyed onto the second reversal guiding path 20, and just after the leading edge of the document is detected by the sensor S2, the document sheet P is stopped once. When conveyance rollers 21 and 22 start their rotation, the document sheet P is conveyed to the image reading exposure section R. In the image reading exposure section R, the document sheet P is guided by the sheet guiding plate 24 while being conveyed by the platen roller 23, and the second page P2 is irradiated by the irradiation lamp 25, and the image on the second page P2 is successively read out in the image reading section R1 through the mirror 26 and the lens L.

Next, the document sheet P is conveyed through the guiding path 112 by conveyance rollers 14 and 29, and conveyed again to the reversal section 18 by reversal rollers 15 and 16. Herein, the document sheet P is placed such that the second page P2 of the document sheet P faces the downside and the fist page P1 faces the upper side, and further, the document sheet P is stopped in the state that the trailing edge portion of the document sheet P is nipped between reversal rollers 15 and 16.

Figure 12:
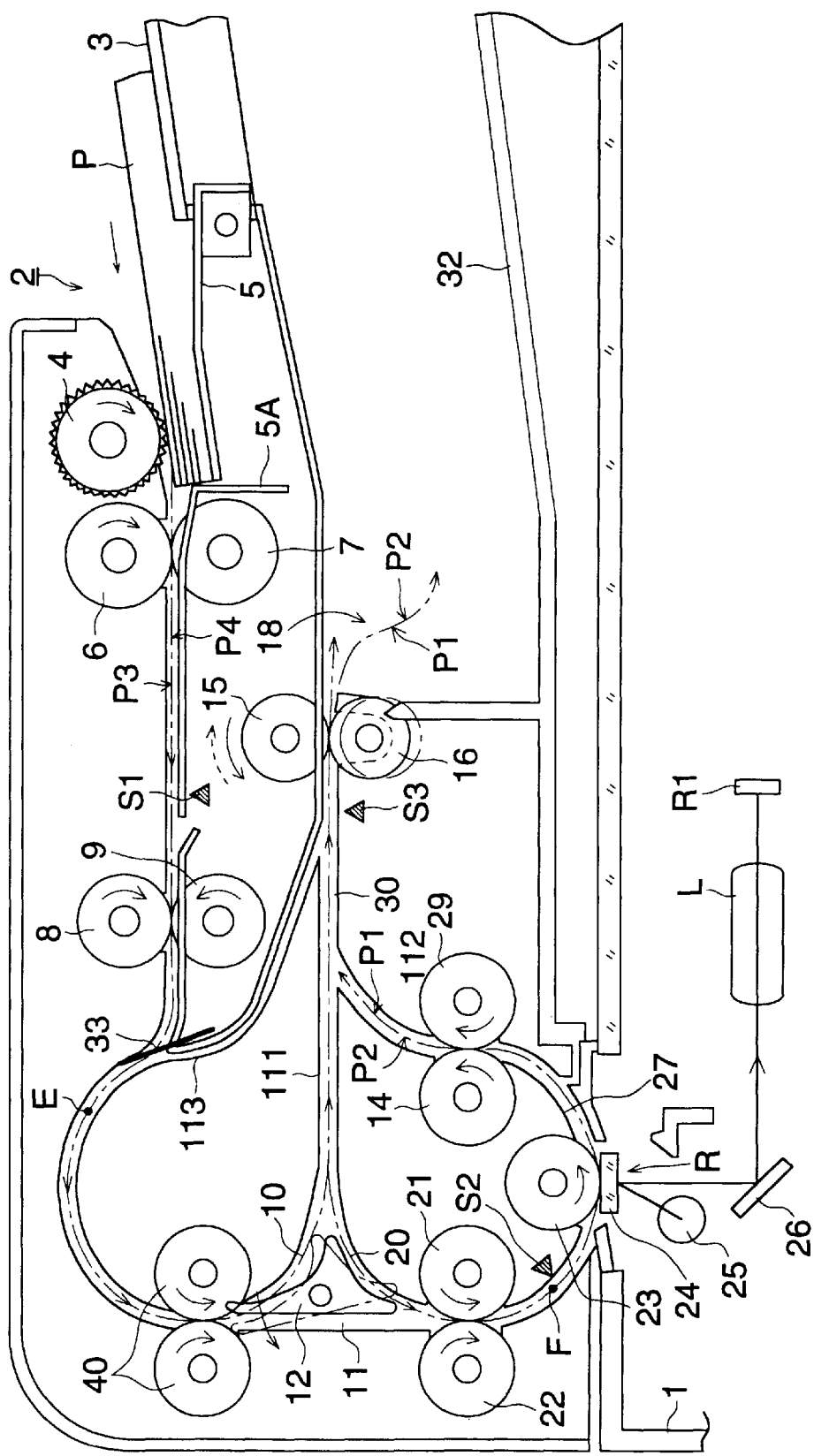
FIG. 12 is a sectional view at the time of obverse side reading of the automatic document conveyance apparatus shown in FIG. 10.

Next, as shown in FIG. 12, reversal rollers 15 and 16 start their rotation in the direction shown by a dotted line, and start the conveyance. On the other hand, the second page of the two-sided document sheet placed on the sheet feeding tray 3 is fed by the pick-up roller 4, and is stopped once at register rollers 8 and 9. The first document sheet P is conveyed on the first reversal guiding path 111 by reversal rollers 15 and 16, conveyed on the second reversal guiding path 20 which is opened by the switching guide member 12, and stopped once just after the leading edge of the document is detected by the sensor S2. When conveyance rollers 21 and 22 start the rotation, conveyance of the document sheet P is started. On the other hand, the stopped second document sheet P is conveyed by the rotation of register rollers 8 and 9 from the guiding path 10 to the first reversal guiding path 111 while being guided by the switching guide member 12.

Herein, the trailing edge of the first document sheet P remains at a position of reversal rollers 15 and 16, and the trailing edge of the first document sheet P and the leading edge of the second document sheet P are conveyed being in contact with each other in the first reversal guiding path 111, and when conveyance rollers 21 and 22 are rotated and start the conveyance, the reversal roller 15 and the reversal roller 16 are separated from each other, and holding of the document sheet P is released.

Further, the leading edge of the second document sheet P is conveyed at a position of reversal rollers 15 and 16, and even if the trailing edge of the first document sheet P remains between reversal rollers 15 and 16, the reversal roller 15 is moved in the arrowed direction, and because the reversal rollers 15 and 16 are separated from each other, even when the leading edge of the second document sheet P is in contact with the trailing edge of the first document sheet P, these document sheets P are smoothly conveyed to the reversal section 18.

In the present embodiment, the following control is carried out: after a predetermined time has passed from the rotation start of reversal rollers 15 and 16 in the direction shown by a dotted line which is the start of the document conveyance at the time of the first page reading of the first document sheet P, for example, after the time period necessary when the document is conveyed by the distance of 50–60 mm, the leading edge of the second document sheet P reaches reversal rollers 15 and 16.

Next, the first document sheet P conveyed by conveyance rollers 21 and 22, is conveyed to the image reading exposure section R, and in the image reading exposure section R, the document sheet P is guided onto the sheet guiding palate 24 surface while being conveyed by the platen roller 23, and the first page P1 of the document sheet P is irradiated by the irradiation lamp 25, and the image on the first page P1 is successively read out in the image reading section R1 through the mirror 26 and the lens L.

The document sheet P whose obverse side image is read out, passes through the guiding path 112 by conveyance rollers 14 and 29, and is conveyed to the delivery sheet guiding path 30 against the rotation of reversal rollers 15 and 16 or following the rotation, and is delivered onto the delivery sheet section 32 in the state that the obverse side P1 of the first document sheet P faces the down side.

In this manner, the document sheet P on both sides of which images are formed, is delivered with the first page facing downward, and next second document sheet P is delivered also in the same manner, with the third page P3 facing downward, and even after images of a plurality of document sheets P with two-sided images are read, document sheets P are delivered in the state that the page order is aligned.

In either case of the fixed size mode or the mixed-size mode, the above-described document conveyance processes are carried out, and in the fixed size mode, the document size is detected by the side plate 3A and micro switches MS1 and MS2, and in the mixed-size mode, the document size is detected by sensor S1 in the document conveyance processes. These document size detection is basically the same as in Embodiment 1.

(2) Single side reading

Figure 13:
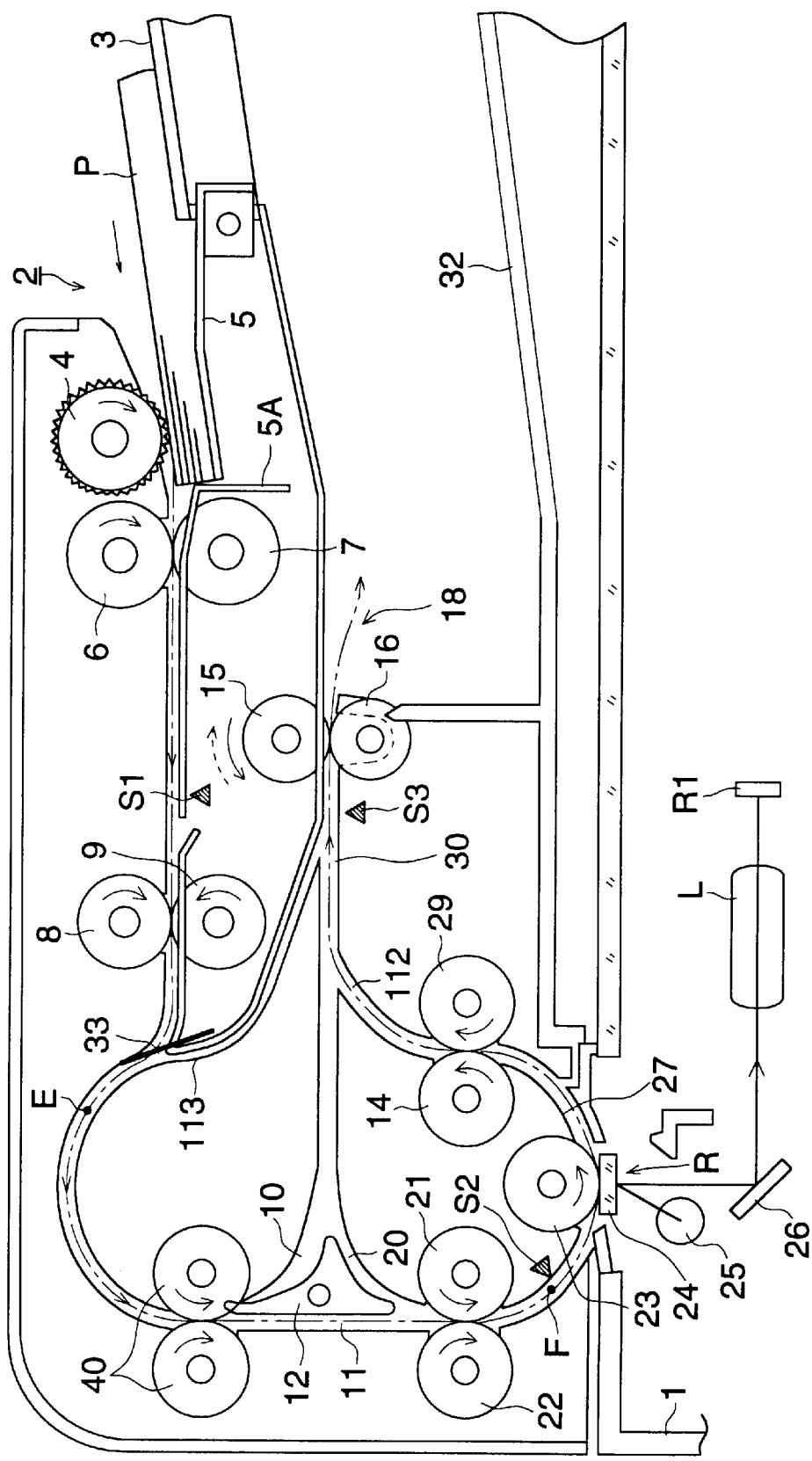
FIG. 13 is a sectional view at the time of one side reading of the automatic document conveyance apparatus shown in FIG. 10.

FIG. 13 is a sectional view of Embodiment 3 in the state of single side reading.

In this case also, the document sheet P is placed on the sheet feeding tray 3 with the image of the document sheet P facing upward. The document sheets P is fed by the pick-up roller 4 from the first sheet of the document sheets P, and is successively conveyed one by one sheet as described above, and conveyed onto the guiding path 11 by register rollers 8 and 9, and the conveyance rollers 40 after the guiding path 11 is opened by the switching guide member 12 placed at the position shown by a solid line.

Next, the document sheet P is guided to conveyance rollers 21 and 22 from the guiding path 11, and is conveyed to the image reading exposure section R. In the image reading exposure section R, the obverse side of the document sheet P is irradiated by the irradiation lamp 25, and the image is read out through the mirror 26 and the lens L in the image reading section R1. The document sheet P passed the reading position, is conveyed onto the delivery sheet guiding path 112 by the conveyance rollers 14 and 29, and reversal rollers 15 and 16 are rotated in the delivery sheet direction, and the document sheet P is delivered onto the delivery section 32 in the state that the image of the first document sheet P faces downward.

In the fixed size mode, the document size is detected by the side plate 3A and micro switches MS1 and MS2.

In the mixed document mode, the document sheet P is conveyed by register rollers 8 and 9, further conveyed by conveyance rollers 21 and 22, and through the platen roller 23, conveyed to the reversal section 18. In this conveyance processes, the size of the document sheet P is detected by the sensor S1. That is, the document size is detected by the time period from the rotation start of the register rollers 8 and 9 to the detection of the trailing edge by the sensor S1. The document conveyance is stopped after a predetermined time from the detection of the trailing edge of the document by the sensor S1. The document is stopped in the state that its trailing edge is located at a position shown by E. Reading is not conducted in this document conveyance processes.

Next, conveyance rollers 21 and 22 are reversely rotated in the direction shown by a dotted line, and the document sheet P is reversal-conveyed. The reversal-conveyed document sheet P is conveyed to the reversal section 18 through conveyance rollers 40 and the guiding path 113, and the leading edge of the document (the trailing edge in the conveyance process from conveyance rollers 21 and 22 to the reversal section 18) is detected by the sensor S2, and the document sheet P is stopped by the detection signal. A one-way flapper 33 formed of an elastic plate is provided at the inlet of the guiding path 113, and does not send the document sheet P conveyed from the guiding path 11 in the direction of the register rollers 8 and 9, but surely guides it onto the guiding path 113.

Next, conveyance rollers 21 and 22 start the rotation again in the direction shown by a solid line, and delivers the document sheet P onto the delivery sheet section 32 through the platen roller 23 and reversal rollers 15 and 16. Reading is conducted in this conveyance process.

Three embodiments are described above, and in common to these embodiments, the document sheet P is first conveyed to the reversal section, the document is reversed, and after that, two-side reading is conducted. According to the structure of the present invention, when the document size is detected by the sensor provided on the document conveyance path and reading is conducted, a decrease of the reading speed due to providing the document size detection process, can be prevented. In the conventional document reading apparatus, however, when it is necessary to conduct document size detection by the sensor provided in the conveyance path, there is a problem in which the reading efficiency in the case where mixed-size documents are read is more decreased than the reading efficiency in the case of the fixed size document. However, in the above embodiments of the present invention, there is no such a problem, and the reading speed of the mixed-size documents is increased.

In the present invention, in the two-side reading which both sides of the document are read, is achieved. Initially the document is reversed, and after that, the document is conveyed to the reading position, so that the reading efficiency when both sides of a large number of document sheets are read is increased, and high speed two-side reading of a large number of document sheets can be attained.

Particularly, since a preceding document and a succeeding document can be positioned together simultaneously in the reversal path in which the document is reversed before reading, without any trouble in the document conveyance, a high speed reading can be attained.

What is claimed is:

1. An automatic document conveyance apparatus comprising:
   (a) a document feeding section, on which a plurality of documents can be placed, that feeds the documents placed thereon one by one therefrom;
   (b) a zigzag reversal path through which each of the documents fed from the document feeding section is reversed with respect to front and back sides thereof;
   (c) a reading position forming device that forms an image reading position of each of the documents fed zigzag from and conveyed to the zigzag reversal path; and
   (d) a document ejection tray on which each of the documents is placed after being passed through the reading position forming device and ejected through an ejection paths;

wherein the documents fed from the document feeding section are conveyed to the zigzag reversal path at which the documents are reversed by a U-turn movement, the documents are fed zigzag to the reading position at which one side of each of the documents is read, the documents are conveyed again to the zigzag reversal path at which the documents are reversed again, the documents are fed zigzag again from the zigzag reversal path to the reading position at which the other side of each of the documents is read, and then the documents are ejected from the reading position to the document ejection tray;

wherein the document feeding section comprises a separation member that separates the plurality of documents one by one; and wherein the zigzag reversal Path is located under the document feeding section and over the document election tray.

2. The automatic document conveyance apparatus of claim 1, wherein the documents are conveyed so that a preceding document which is delivered from the zigzag reversal path and a succeeding document which is conveyed to the zigzag reversal path are positioned together simultaneously in the zigzag reversal path.

3. The automatic document conveyance apparatus of claim 1, further comprising a document detecting device that detects a length of each of the documents in a conveyance direction, and wherein the documents comprise mixed documents which have lengths different from each other.

4. The automatic document conveyance apparatus of claim 1, further comprising a first roller provided in a path between the zigzag reversal path and the image reading position that attenuates conveyance friction of the documents during conveyance along said path, and a second roller provided in the zigzag reversal path that attenuates conveyance friction of the documents during conveyance along the zigzag reversal path.

* * * * *